(12) United States Patent
Ebbesson et al.

(10) Patent No.: US 8,523,036 B2
(45) Date of Patent: Sep. 3, 2013

(54) HAMMER TACKER

(75) Inventors: Jan Ebbesson, Åsenhöga (SE); Björn Söderholm, Mullsjö (SE)

(73) Assignee: Isaberg Rapid AB, Hestra (SE)

( * ) Notice: Subject to any disclaimer, the term of this patent is extended or adjusted under 35 U.S.C. 154(b) by 394 days.

(21) Appl. No.: 12/526,761

(22) PCT Filed: Jan. 22, 2008

(86) PCT No.: PCT/SE2008/000047
§ 371 (c)(1),
(2), (4) Date: Jan. 8, 2010

(87) PCT Pub. No.: WO2008/100192
PCT Pub. Date: Aug. 21, 2008

(65) Prior Publication Data
US 2010/0133314 A1    Jun. 3, 2010

(30) Foreign Application Priority Data
Feb. 12, 2007 (SE) ..................... 0700329

(51) Int. Cl.
*B25C 5/02* (2006.01)
*B25C 5/06* (2006.01)

(52) U.S. Cl.
USPC .......................................................... 227/120

(58) Field of Classification Search
USPC ................... 227/119–120, 133, 175.1–182.1
See application file for complete search history.

(56) References Cited

U.S. PATENT DOCUMENTS

| 2,519,617 | A | * | 8/1950 | Wember ........................ 227/133 |
| 2,524,061 | A | * | 10/1950 | Lindstrom .................... 227/127 |
| 2,653,316 | A | | 9/1953 | Beckman et al. |
| 2,661,999 | A | * | 12/1953 | Abrams ........................ 227/133 |
| 3,739,973 | A | * | 6/1973 | Abrams ........................ 227/120 |
| 4,096,957 | A | | 6/1978 | Iverson et al. |
| 4,182,474 | A | * | 1/1980 | Sato .............................. 227/99 |
| 4,552,296 | A | * | 11/1985 | Sheng .......................... 227/109 |
| 4,700,876 | A | * | 10/1987 | Wingert ........................ 227/131 |
| 4,858,813 | A | * | 8/1989 | Wingert ........................ 227/131 |
| 4,946,087 | A | * | 8/1990 | Wingert ........................ 227/131 |
| 5,044,812 | A | | 9/1991 | Ardelt et al. |
| 5,814,055 | A | * | 9/1998 | Knodel et al. ................ 606/151 |
| 5,975,401 | A | * | 11/1999 | Fealey .......................... 227/134 |
| 6,012,623 | A | * | 1/2000 | Fealey .......................... 227/134 |
| 2005/0057014 | A1 | * | 3/2005 | Ramsey ................. 280/124.116 |
| 2005/0167467 | A1 | * | 8/2005 | Sprich .......................... 227/151 |

FOREIGN PATENT DOCUMENTS

| DE | 25 30 996 A1 | 1/1977 |
| EP | 0 958 895 A2 | 11/1999 |
| WO | WO 2006/009496 A1 | 1/2006 |
| WO | WO 2006/110074 A1 | 10/2006 |

* cited by examiner

Primary Examiner — Robert Long
(74) Attorney, Agent, or Firm — Miles & Stockbridge P.C.

(57) ABSTRACT

Stapler (1) comprising a body (2) and a magazine (3) which in its rear portion is connected pivotably via a connecting pin (6) to said body in such a way that said magazine in its forward portion can be moved in a direction (P) into and out of the body, the body (2) having integral bushings (9, 10) which have connecting surfaces (11, 12) whose longitudinal extent (D) is greater than the thickness (T) of the body material.

8 Claims, 5 Drawing Sheets

SNITT B-B

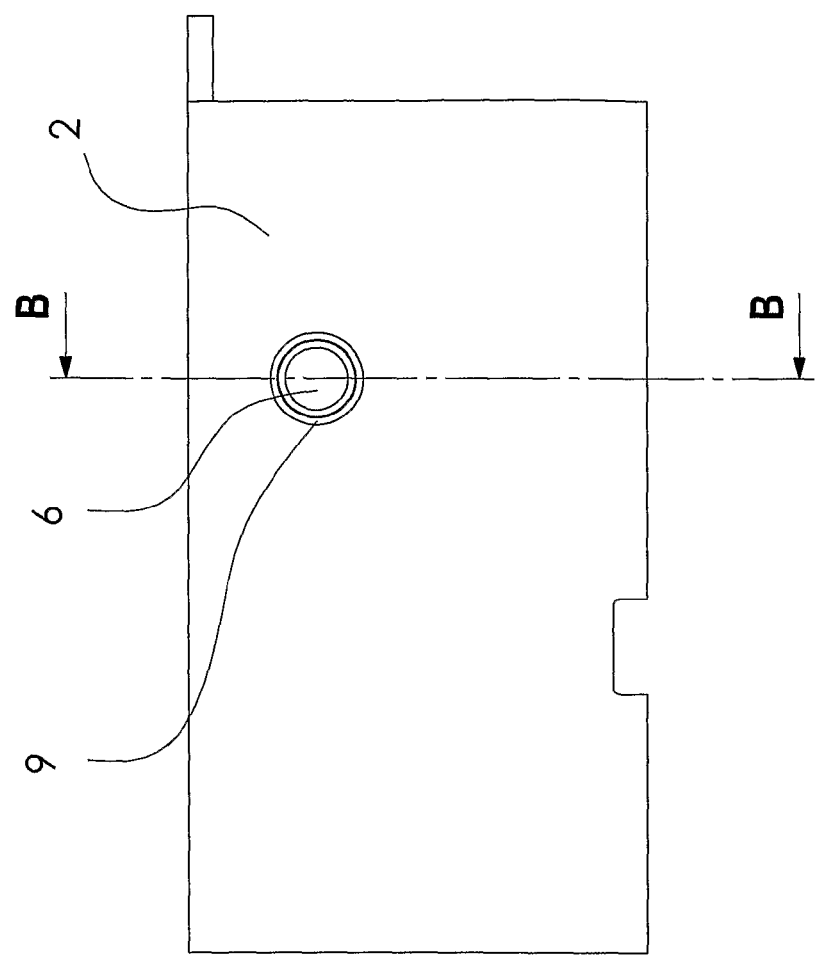
Fig.4 VY A-A
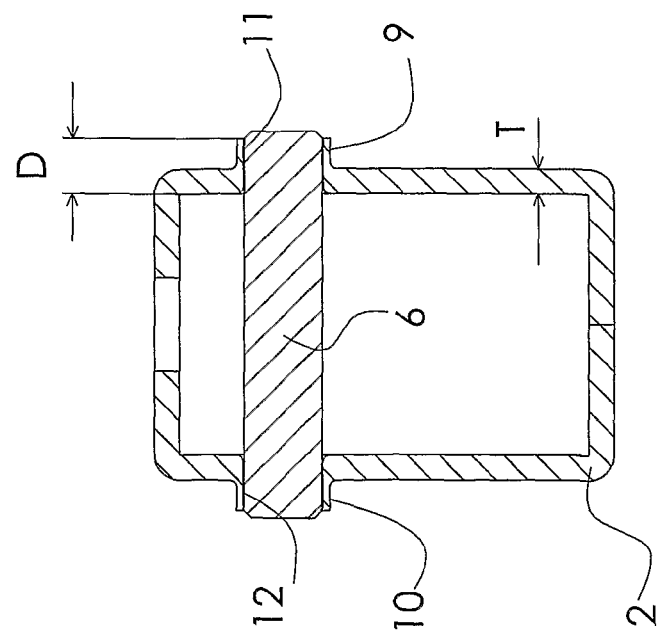
Fig.5 SNITT B-B

SNITT C-C

HAMMER TACKER

TECHNICAL FIELD

The present invention relates to a hammer tacker comprising a body and a magazine which in its rear portion is connected pivotably via a connecting pin to said body in such a way that said magazine can in its forward portion be moved into and out of the body.

STATE OF THE ART

Hammer tacker of the kind indicated above are previously known, but those previously known have disadvantages with regard to the fastening of the connecting pin to the body. One form of fastening involves holes being stamped in the body and the connecting pin connected to the magazine being fitted to these holes, another involves the stamped holes being provided with bushings to which the connecting pin is connected.

The disadvantage of only stamping holes in the body is that the edges of the holes thus formed have very limited connecting surfaces for the connecting pin. This results in the connecting pin being unstably connected to the body and in the magazine consequently also being unstably connected to the body, which means that during use both the pin fastening and the magazine are subject to a great deal of wear. It is of course conceivable to increase the size of the connecting surfaces by increasing the thickness of the body material, but this is not practicable in that the hammer tacker would thereby become too heavy, causing unnecessary stress on the user.

The disadvantage of providing the stamped holes with bushings is that from the manufacturing point of view it is very difficult to connect the bushings to the body in such a way that in their mutual relationship the bushings each have their central longitudinal axis coinciding with the centreline of the connecting pin, even if the stamped holes are so positioned, which makes it difficult to fit the connecting pin. There is also great risk that even if the bushings coincide with said centreline, they may each have a positioning which is skewed relative to the centreline, thereby likewise making it difficult to fit the connecting pin. The fact that the bushings are often in such a position that their central longitudinal axis does not fully coincide with the centreline of the connecting pin results in stresses between the pin and the bushings and in the magazine being fitted to the body in a skewed state. Both of these states mean that using the hammer tacker causes stresses which tend to break the bushings loose from their fastening to the cover, and in cases where this fastening is either of a mechanical kind such as embossing, upsetting or threading or by welding there is great risk of the fastenings of the bushings in each case becoming partly loosened. If this happens, the hammer tacker will lose much of its function, since the magazine will then be very unstably connected to the body, thereby greatly impairing the hammer tacker's function. Even if the fastenings of the bushings do not loosen, there is still a very great risk that after a certain amount of use the magazine will become unstably fastened to the cover, since play may easily arise between the stamped holes and the bushings, between the bushings and the connecting pin and between the connecting pin and the magazine, all of which will lead to the hammer tacker suffering impaired function and being worn out prematurely. It also means that fitting the bushings to the body entails a large number of assembly stages, making the hammer tacker unnecessarily expensive.

PROBLEM

There is thus a need for a hammer tacker which has connecting surfaces larger than those present when only stamped holes are used, and which has bushings which are not separate and fitted to the body and do not require any extra assembly work.

SOLUTION

The present invention describes a hammer tacker with a structure which overcomes the problems indicated of a hammer tacker of the kind indicated in the introduction and is characterised by the body having integral bushings which have connecting surfaces whose longitudinal extent is greater than the thickness of the body material.

The present invention is also characterised in that the bushings are peened up from the body material.

The present invention is further characterised in that the bushings have an axial length which is between 1 and 2.5 times greater than the thickness of the body material.

The present invention is yet further characterised in that the bushings have an axial length which is between 1.5 and 2.5 times greater than the thickness of the body material.

The present invention is still further characterised in that the bushings have an axial length which is between 2 and 2.5 times greater than the thickness of the body material.

Finally, the present invention is characterised in that the bushings are each reinforced by a respective reinforcing sleeve which closely surrounds the respective bushing.

DESCRIPTION OF THE DRAWINGS

The invention is described below with reference to a preferred embodiment depicted in the attached drawings, in which:

FIG. 4 is a view along the section A-A in FIG. 3;

FIG. 5 is a side view of the depiction in FIG. 4;

PREFERRED EMBODIMENT

Figure 1:
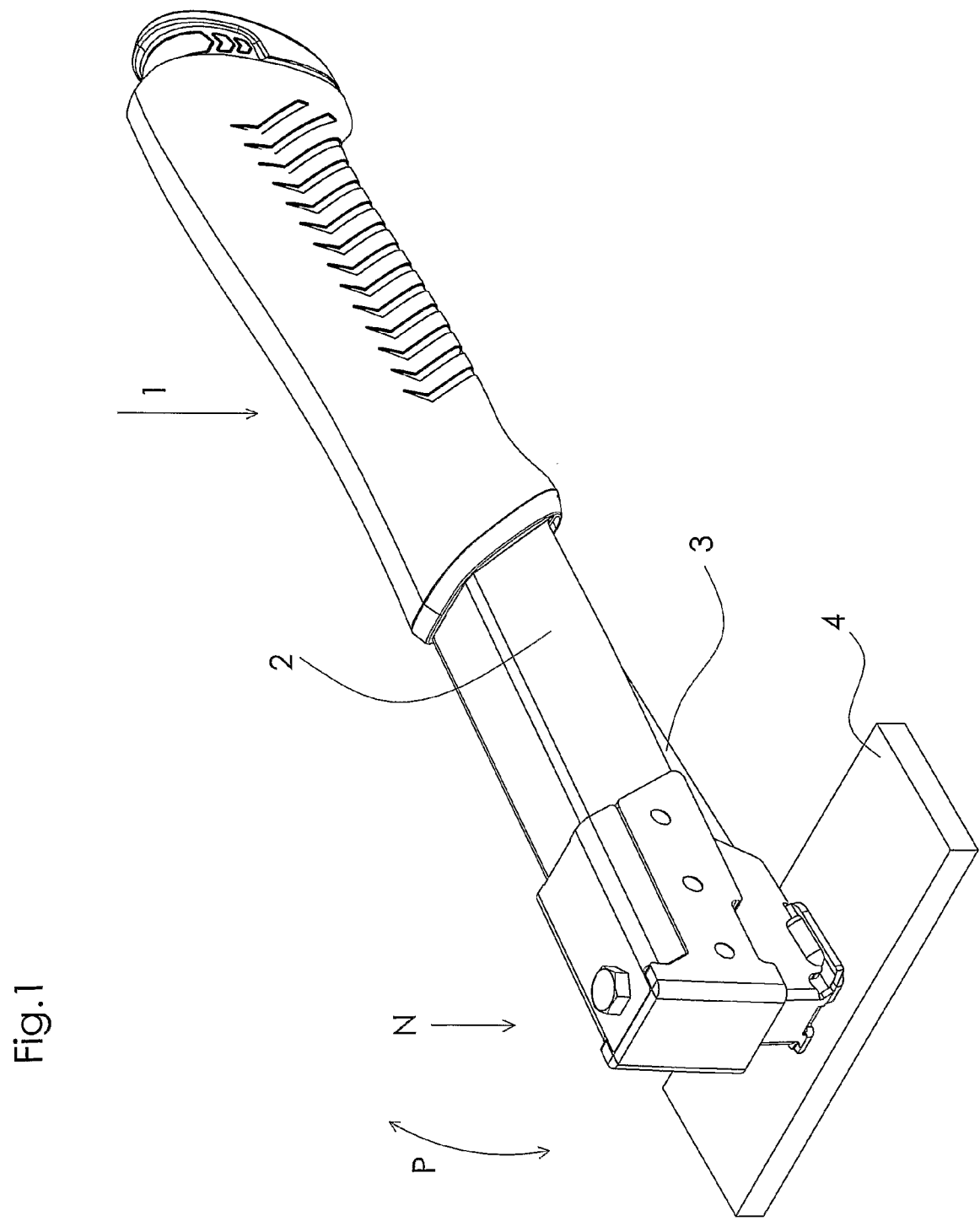
FIG. 1 is a general view of a hammer tacker according to the present invention.

FIG. 1 depicts a hammer tacker 1 according to the present invention. The hammer tacker comprises a body 2 and a magazine 3. The body 2 and the magazine 3 are connected at the rear portion by a connecting pin which is not depicted in FIG. 1 but is described below. The connection is such that the magazine can at a forward portion be moved into and out of the body in the motion represented by the double arrow P. When a staple (not depicted in the drawing) is to be driven into a workpiece 4, the hammer tacker 1 is moved downwards at its front edge towards the workpiece in the direction N and the magazine 3 meets the workpiece 4. Thereafter the body 2 continues in the direction N and the magazine is moved relative to the body into the body, with the result that a driver (not depicted in the drawing) connected to the body is moved towards the workpiece, during which movement it drives into the workpiece a staple accommodated in the magazine. This work cycle is obvious to one skilled in the art and is therefore not further explained herein, but it may generally be understood that it involves large forces on the hammer tacker and in particular at the connection between the body and the magazine.

Figure 2:
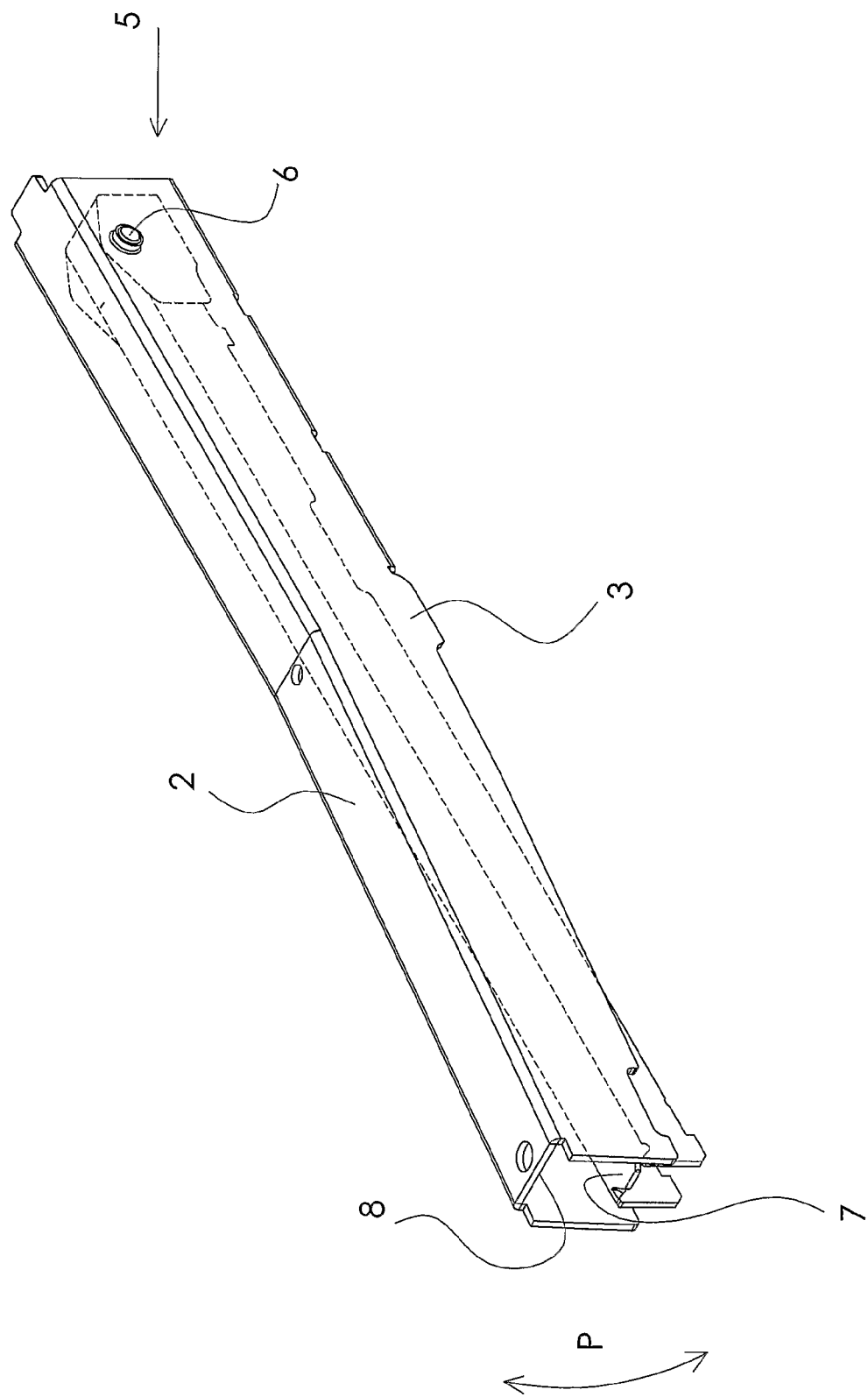
FIG. 2 is a schematic depiction of the parts essential to the invention of the stapler depicted in FIG. 1.
Figure 3:
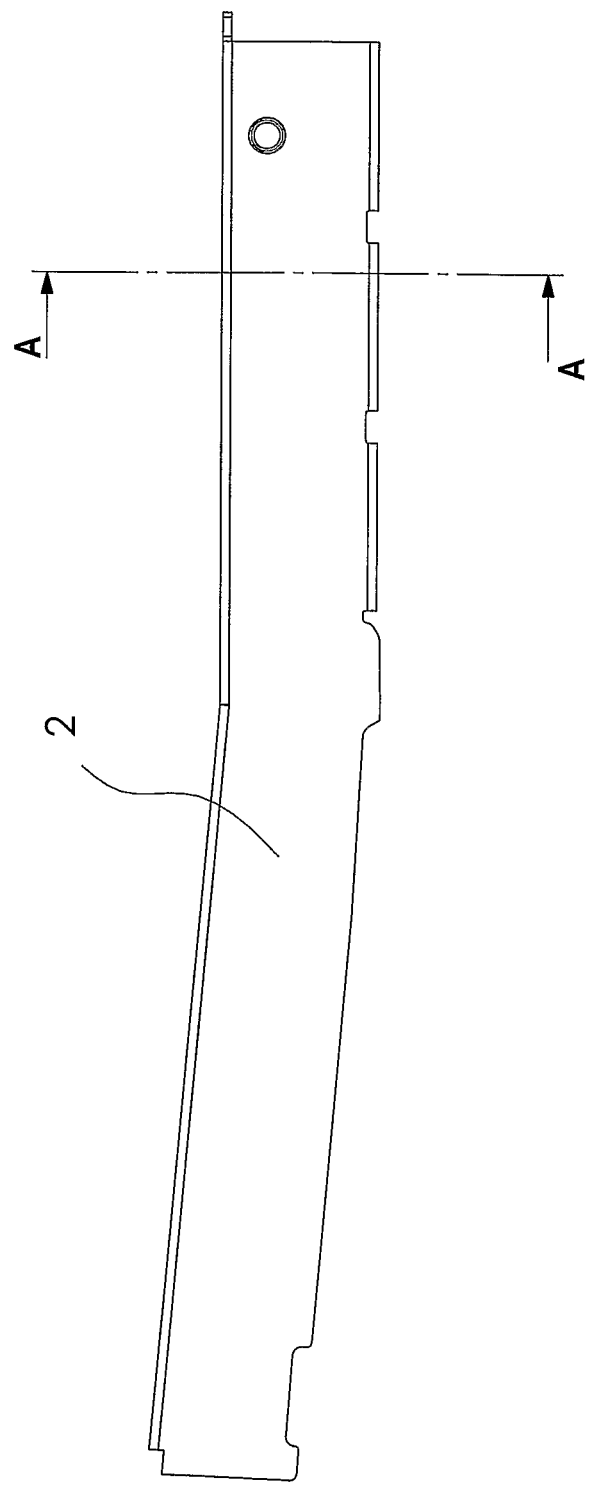
FIG. 3 depicts the body which forms part of the hammer tacker.

FIG. 2 depicts schematically simply the body 2 and the magazine 3 and their connection 5 which takes the form of a connecting pin 6. As illustrated in the drawing, the magazine is journalled within the body and it is also obvious from the drawing that the magazine can move relative to the body in the direction represented by the double arrow P. The magazine reaches a stop when its upper portion 7 meets the lower portion 8 of the body and the magazine's movement in the opposite direction is limited by blocking means not depicted in the drawing. FIG. 3 depicts the body as seen from the side and FIG. 4 is an enlarged view of the region of the body to the right of the line A-A in FIG. 3. These drawings show the connecting pin 6 and the bushing 9 to which it is connected. FIG. 5, which is a sectional view along the section B-B in FIG. 4, clearly shows the connection of the connecting pin 6 to the bushings 9 and 10. As the drawing illustrates, the bushings 9 and 10 are integral parts of the body material of the side walls and are peened up, in a manner known to one skilled in the art, from the body material, so as to project from exterior surfaces of the side walls, and to be continuous with the side wall's. The thickness of the constituent material of the body is denoted by T and the length of the bushing in the axial direction is denoted by D and comprises the respective connecting surfaces 11 and 12 of the bushings. As illustrated in the drawing, D is significantly greater than T, which means that the pin 6 is more stably fastened to the body 2 than if it was only connected to punched holes which would then only have the length T. Peening to a length 1-2.5 times greater than the material thickness T results in an advantageous embodiment, which becomes more advantageous if the above value is between 1.5 and 2.5, and the best situation has been found to be a value of between 2 and 2.5. The fact that the bushings are peened up from the body material means that there is no risk of play between the bushings and the body, thereby substantially reducing the risk of the magazine becoming unstably connected to the body.

Figure 6:
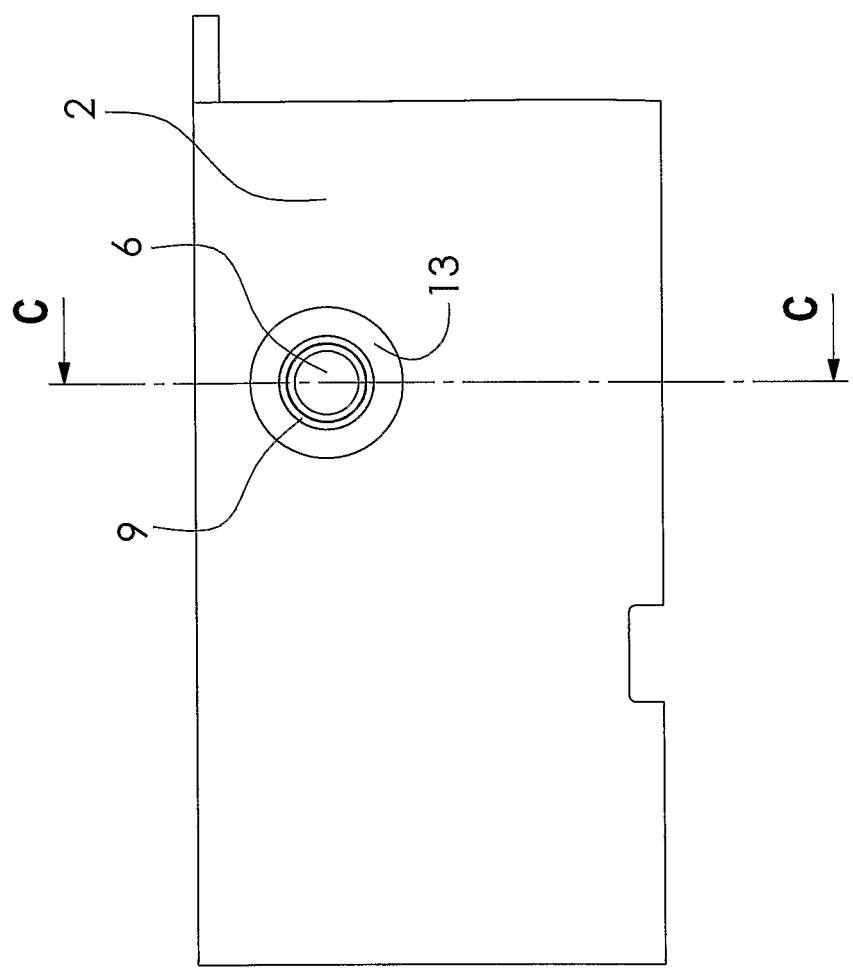
FIG. 6 is a view corresponding to FIG. 5 in which a reinforcing sleeve is clearly shown.
Figure 7:
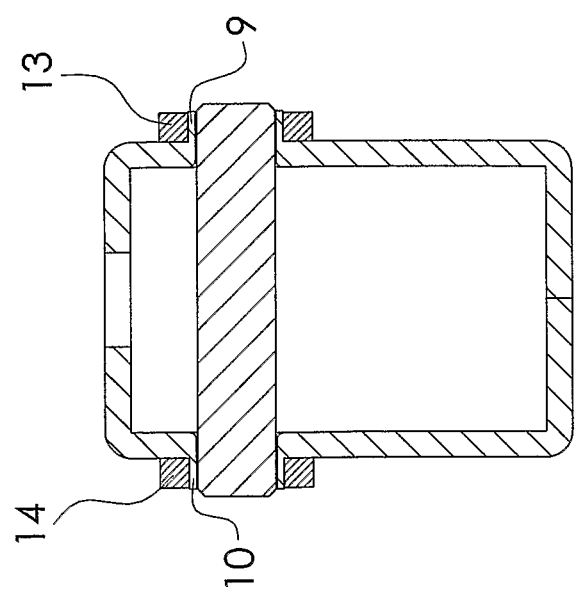
FIG. 7 is a sectional view along the section B-B in FIG. 6.

FIGS. 6 and 7 corresponding respectively to FIGS. 4 and 5 show the bushings 9 and 10 provided with separate reinforcing sleeves 13 and 14 which may be necessary in cases where the body material is unsuitable for peening or where such a large axial length D is required that the bushings would thereby become too thin-walled. Each sleeve closely surrounds an exterior surface of a respective bushing.

The fact that the bushings are peened up from the body eliminates any difficulties with fitting of bushings in cases where loose bushings are fitted in apertures stamped in the body.

The invention is of course not limited by the above description but only by the claims set out below.

The invention claimed is:

1. A stapler comprising a body and a magazine which has a rear portion that is within said body and that is connected pivotably to said body via a connecting pin in such a way that said magazine can, in a front portion, be moved in a direction into and out of the body, CHARACTERISED in that the body has side walls with bushings which project perpendicularly from exterior surfaces of the side walls, which are integral parts of the body material of the side walls, which are continuous with the side walls, and which have connecting surfaces whose longitudinal extent is greater than the thickness of the body material of the side walls.

2. A stapler according to claim 1, CHARACTERISED in that the bushings have a longitudinal extent which is between 1 and 2.5 times greater than the thickness of the body material of the side walls.

3. A stapler according to claim 2, CHARACTERISED in that the bushings have a longitudinal extent which is between 1.5 and 2.5 times greater than the thickness of the body material of the side walls.

4. A stapler according to claim 2, CHARACTERISED in that the bushings have a longitudinal extent which is between 2 and 2.5 times greater than the thickness of the body material of the side walls.

5. A stapler according to claim 1, CHARACTERISED in that the bushings are each reinforced by a respective separate reinforcing sleeve which closely surrounds an exterior surface of a respective bushing.

6. A stapler according to claim 2, CHARACTERISED in that the bushings are each reinforced by a respective separate reinforcing sleeve which closely surrounds an exterior surface of a respective bushing.

7. A stapler according to claim 3, CHARACTERISED in that the bushings are each reinforced by a respective separate reinforcing sleeve which closely surrounds an exterior surface of a respective bushing.

8. A stapler according to claim 4, CHARACTERISED in that the bushings are each reinforced by a respective separate reinforcing sleeve which closely surrounds an exterior surface of a respective bushing.

* * * * *